(12) United States Patent
DiCicco et al.

(10) Patent No.: US 10,080,974 B2
(45) Date of Patent: Sep. 25, 2018

(54) REMOVABLE, EXTERNAL PERIPHERAL HOLDER FOR A VIDEO GAME CONTROLLER

(71) Applicants: Joseph DiCicco, Hamilton, NJ (US); David Braun, Hopewell, NJ (US); Roy Rosser, Monmouth Junction, NJ (US)

(72) Inventors: Joseph DiCicco, Hamilton, NJ (US); David Braun, Hopewell, NJ (US); Roy Rosser, Monmouth Junction, NJ (US)

(*) Notice: Subject to any disclaimer, the term of this patent is extended or adjusted under 35 U.S.C. 154(b) by 0 days.

(21) Appl. No.: 15/607,468

(22) Filed: May 27, 2017

(65) Prior Publication Data
US 2018/0001217 A1 Jan. 4, 2018

Related U.S. Application Data

(60) Provisional application No. 62/342,661, filed on May 27, 2016.

(51) Int. Cl.
  *A63F 13/98* (2014.01)
  *A63F 13/24* (2014.01)
  *A63F 13/92* (2014.01)

(52) U.S. Cl.
  CPC ............ *A63F 13/98* (2014.09); *A63F 13/24* (2014.09); *A63F 13/92* (2014.09); *A63F 2300/1043* (2013.01)

(58) Field of Classification Search
  CPC .......... A63F 13/98; A63F 13/24; A63F 13/92
  See application file for complete search history.

(56) References Cited

U.S. PATENT DOCUMENTS

| 7,833,097 B1 * | 11/2010 | Maddox ................. A63F 13/23 455/556.1 |
| 2014/0162779 A1 * | 6/2014 | Kawaguchi ........... G06F 1/1694 463/31 |
| 2014/0364231 A1 * | 12/2014 | Cramer .................. A63F 13/06 463/37 |

* cited by examiner

*Primary Examiner* — William H McCulloch, Jr.
*Assistant Examiner* — Yingchuan Zhang
(74) *Attorney, Agent, or Firm* — r.r (princeton); Roy Rosser

(57) ABSTRACT

A removable, external peripheral holding device for a game-controller is disclosed. The device has left and right retaining annuli, each made to be a circumscribing, external fit to the respective left and right holding portions of a game controller, enabling the device to be removably attached to the game-controller. A receiving receptacle is connected to the retaining annuli by a cantilevered connecting element that extends forward of the game controller when the game controller is held in a playing orientation. This can accept a removable tab that is attached to a structural element. In one embodiment, the structural element is a lateral vision shield that may be foldable. In a second embodiment the structural element accommodates a smart phone.

8 Claims, 3 Drawing Sheets

REMOVABLE, EXTERNAL PERIPHERAL HOLDER FOR A VIDEO GAME CONTROLLER

CROSS-REFERENCE TO RELATED APPLICATIONS

This application claims priority to U.S. Ser. No. 62/342,661 filed May 27, 2016, the contents of which are fully incorporated herein by reference.

BACKGROUND OF THE INVENTION

(1) Field of the Invention

The invention relates to the human necessity of amusement as satisfied in the form of video games, and more particularly to an accessory for a video gaming system, and even more particularly to the constructional details of a removable, external peripheral holder for a video game controller.

(2) Description of the Related Art

The technical problem of augmenting video game controllers with physical peripheral devices, such as additional displays or artifacts, lies within the technical fields of mechanical or product design.

Video game players often compete while physically located alongside each other. The players typically use hand-held game controllers with a variety of buttons that may be used to select options that effect outcomes in the game being played.

By observing an opponent's readiness to select particular buttons, an experienced player may anticipate their opponent's next move and prepare to counter, or defend against it, even before the final selection is made. In this manner, by observing an opponent's intended action, a player may gain a significant advantage towards winning the game.

In one embodiment, the present invention provides a novel and innovative way to shield a player's game controller so as to prevent such observations being possible.

Another problem with video games may be that there are complex rules to be followed that are not always easy to remember. In further embodiments, the present invention may also provide a game player means to display information that may be able to assist them in knowing what options are available. The "cheat sheet" may also provide instructions for implementing those options.

The relevant prior art includes:

US Patent Application no.: 20160051902 published by Matthew R Joynes et al. on Feb. 25, 2016 entitled "Combination Computing Device and Game Controller with Flexible Bridge Section" that describes a combination computing device, input device, structural bridge, and a communication link is provided. The input device electronically communicates with the computing device. The input device provides a pair of control modules. The structural bridge, masks a mid-portion of the back of the computing device, secures the pair of control modules one to the other, and adaptively accommodates the length of the computing device. A first of the pair of control modules includes at least a tensioning mechanism secured to the structural bridge. The communication link facilitates communication between the control modules, the computing device, and a second display, which is mechanically disassociated from electronic display.

U.S. Pat. No. 6,773,349 issued to Hussaini et al. on Aug. 10, 2004 entitled "Video game controller with integrated video display" that describes a computer game controller with integrated video display device. The controller has a video device mounted or otherwise integrated into a hand held controller. A communication cable connects the controller with a stand-alone computer game device. The cable establishes a communication link to facilitate the transmission of both command signals and audio/video signals between the controller and computer device. The integrated controller and video display device of the present invention provides two-way interaction with the stand-alone computer device within a single accessory device. The integrated controller and video display device may also incorporate a speaker or headphone jack to deliver additional audio stimulation.

US Patent Application no.: 20150174482 published by Eric Hirshberg et al. on Jun. 25, 2015 entitled "Game Controller with Clamp for Portable Device" that describes a game controller for use with handheld game devices, for example smartphones, includes a cradle for holding the smartphone. The cradle is pivotable between an open position, extending from a base of the game controller, and a closed position in which the cradle is about a bottom wall of the base.

Various implementations are known in the art, but fail to address all of the problems solved by the invention described herein. Various embodiments of this invention are illustrated in the accompanying drawings and will be described in more detail herein below.

BRIEF SUMMARY OF THE INVENTION

An inventive apparatus that may function as a removable, external peripheral holding device for a game controller is disclosed.

In a preferred embodiment, the device may have both a left and a right retaining annulus, each of which may be shaped and sized to be a circumscribing, external fit to a respective left and a right holding portion of a game controller. These may, for instance, be used to removably attach the device to the game controller.

The device may also have a receiving receptacle connected to the retaining annuli by a cantilevered connecting element that may extend forward of the game controller when the game controller is held in a playing orientation.

The receiving receptacle may be designed to accept a removable tab. The removable tab may be attached to a structural element that may in turn be attached to, or accommodate an external peripheral device such as, but not limited to, a lateral vision shield, a smart phone, a video display or a simple insignia indicative of a commercial or team affiliation, or some combination thereof.

Therefore, the present invention succeeds in conferring the following, and others not mentioned, desirable and useful benefits and objectives.

It is an object of the present invention to provide a means to easily and removably attach one or more game enhancing structures to a video game controller.

It is another object of the present invention to provide a structure that is both itself removable from the game controller and may also have structures attached to, and removed from, it.

DETAILED DESCRIPTION OF THE INVENTION

Figure 1:
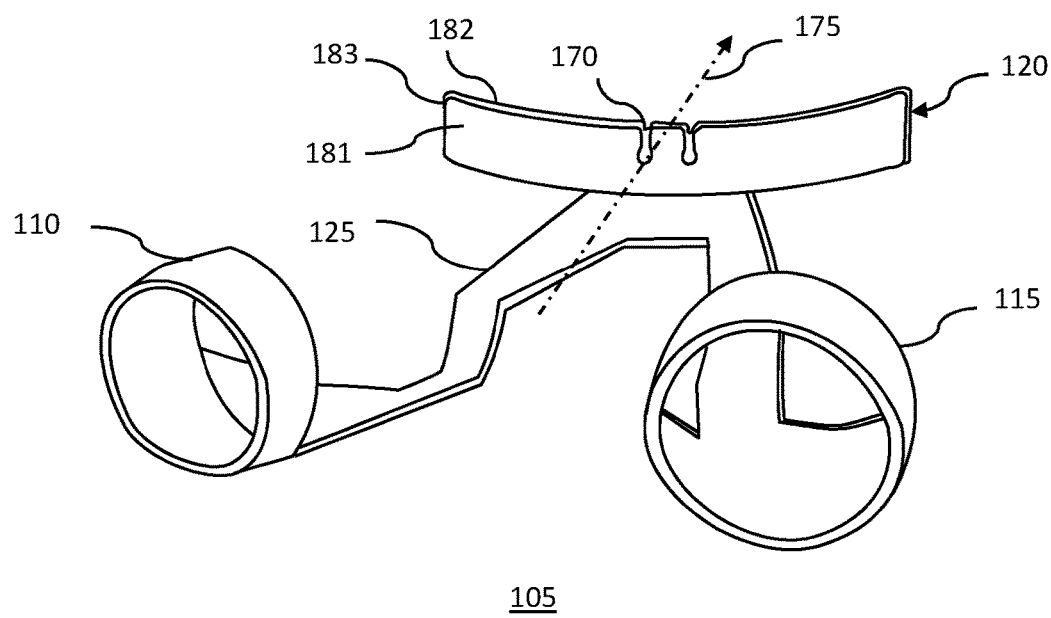
FIG. 1 shows an isometric view of a removable, external peripheral holder for a video game controller of a preferred embodiment of the present invention.

The preferred embodiments of the present invention will now be described in more detail with reference to the drawings in which identical elements in the various figures are, as far as possible, identified with the same reference numerals. These embodiments are provided by way of explanation of the present invention, which is not, however, intended to be limited thereto. Those of ordinary skill in the art may appreciate upon reading the present specification and viewing the present drawings that various modifications and variations may be made thereto.

FIG. 1 shows an isometric view of a removable, external peripheral holder for a video game controller of a preferred embodiment of the present invention.

In a preferred embodiment, the removable, external peripheral holder 105 for a video game controller may include a left retaining annulus 110 and a right retaining annulus 115. These annuli are designed to be a snug, but removable, fit to the portions of a game controller that a user holds in their hand while playing video games. They are preferably shaped and sized to be a circumscribing, external fit to the respective left and right holding portion of the game controller which may be a standard commercial game controller such as, but not limited to, the game controller for the PlayStation™ 4 (PS4) gaming system marketed by the Sony Corporation of Kōnan Minato, Tokyo, Japan.

The device may include a receiving receptacle 120. This receiving receptacle 120 may be joined to the annuli by a cantilevered connecting element 125.

The receiving receptacle 120 may be intended to removably hold a removable tab that may be attached to a structural element.

In order to accomplish this, the receiving receptacle 120 may have a front retaining element 181 and a rear retaining element 182 separated by a gap 183. The gap 183 may be sized to be a snug, or push, fit to the removable tab.

The retaining elements preferably comprise surfaces oriented perpendicular to a direction of play 175 of the game controller.

The retaining elements may also contain one or more locating slots 170.

Figure 2:
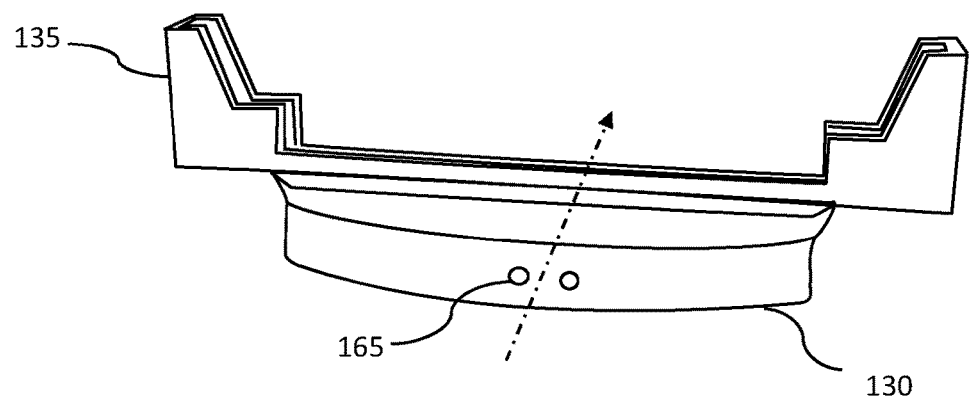
FIG. 2 shows an isometric view of a removable tab with an attached structural element of a preferred embodiment of the present invention.

FIG. 2 shows an isometric view of a removable tab with an attached structural element of a preferred embodiment of the present invention.

The removable tab 130 may be shaped and sized to be a lock-and-key fit to the receiving receptacle shown in FIG. 1. In addition to the blade-like body that is sized and shaped to fit the gap between the receiving receptacle's side walls, the removable tab 130 may have one or more locating tabs 165. These locating tab 165 may correspond in shape and location to the locating slots of the receiving receptacle.

The may also be a structural element 135 attached to the removable tab 130. The structural element 135 may be of direct functional use to the game player, or it may serve to support or hold an element that may be of functional use to the game player.

Figure 3:
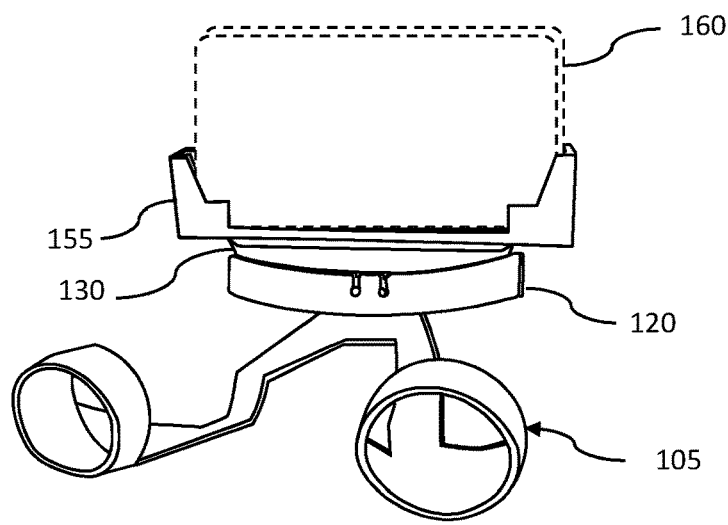
FIG. 3 shows an isometric view of removable, external peripheral holder supporting a smart phone holder in a preferred embodiment of the present invention.

FIG. 3 shows an isometric view of removable, external peripheral holder supporting a smart phone holder that in turn is supporting a smart phone in a preferred embodiment of the present invention.

The smart phone 160 may be held in a structural element that may be designed to be a smart phone holder 155. The smart phone holder 155 may be rigidly attached to a removable tab 130 that is a removable fit to the receiving receptacle 120 of the removable, external peripheral holder 105 for a video game controller.

A smart phone 160 held on the smart phone holder 155 may, for instance, be incorporated into the game being played by suitable apps that may, for instance, allow the game player to have additional features such as, but not limited to, an alternate view of the game being played, a cheat-sheet that may be connected to the internet, a video link to a competitor or some combination thereof.

One of ordinary skill in the art will, however, appreciate that such a holder may instead be used to hold other objects such as, but not limited to, an LED display screen, a simple insignia holder that may contain commercial or team logos, or instructions, or some combination thereof.

Figure 4:
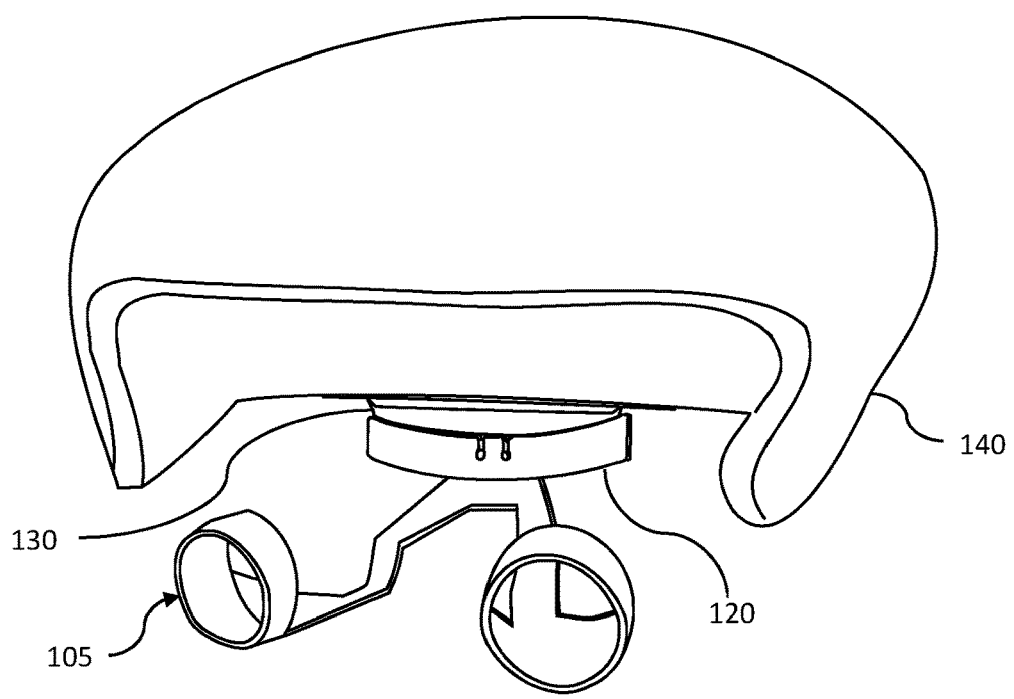
FIG. 4 shows an isometric view of removable, external peripheral holder supporting a lateral vision shield in a preferred embodiment of the present invention.

FIG. 4 shows an isometric view of removable, external peripheral holder supporting a lateral vision shield in a preferred embodiment of the present invention.

The lateral vision shield 140 may be rigidly attached to a removable tab 130 so that it is removable attachable to the removable, external peripheral holder 105 for a video game controller via the receiving receptacle 120.

The lateral vision shield 140 may be shaped and sized to prevent a player's hand and finger positions being observed by someone seated or standing alongside the player.

The utility of the lateral vision shield 140 lies in the fact that video game players often compete while physically located alongside each other. The hand-held game controllers typically have a variety of buttons that a played may be used to select options that effect outcomes in the game being played. A played conversant with what actions the buttons cause, may, by observing an opponent's readiness to select particular buttons, anticipate their opponent's next response. The observer may then be ready to counter, or defend against an action, even before the final selection is made. In this manner, a player may gain a significant advantage towards winning the game. The lateral vision shield 140 provides a way that may prevent such observations being possible.

The lateral vision shield 140 shown in FIG. 4 is intended to be shaped like a football helmet and may, for instance, be decorated with the team colors of a team the player is a fan of.

One of ordinary skill in the art will, however, appreciate that the removable tab 130 may be assume many shapes and still perform the same function.

In addition to decorating the outside of the lateral vision shield 140 with logos, advertising, team icons or other indicia, the inside of the lateral vision shield may also be decorated. The inside surface decorations may in addition or instead of logos, advertising and team icons, be information that may be useful to the player such as, but not limited to, game rules, cheat sheet tips, maps of a region in which the game is being played, or some combination thereof.

The lateral vision shield 140 is preferably made of a light material that may be a plastic such as, but not limited to, polyethylene terephthalate (PET or PETE), polystyrene, polyvinyl chloride (PVC), polyvinylidine chloride, polyethylene or polypropylene, or some combination thereof. The lateral vision shield 140 may also include elements of light metals such as, but not limited to, aluminum or titanium or some combination thereof.

In a further preferred embodiment of the invention, the lateral vision shield 140 may be foldable for easy storage and/or transportation.

Such a foldable lateral vision shield 145 may be facilitated by a variety of mechanisms such as, but not limited to, umbrella type mechanisms, inflation type mechanisms, or folding bar type mechanisms, or some combination thereof.

Figure 5A:
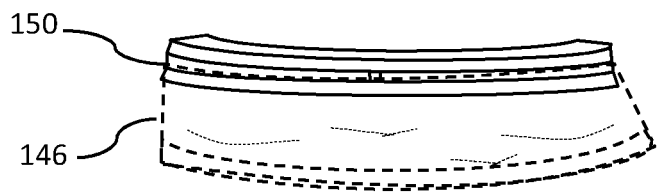
FIG. 5A shows an isometric view of fully closed arched collapsible elements supporting a foldable lateral vision shield in a preferred embodiment of the present invention.

FIG. 5A shows an isometric view of fully closed arched collapsible elements supporting a foldable lateral vision shield in a preferred embodiment of the present invention.

The arched collapsible elements 150 are shown in FIG. 5A in a fully collapsed configuration, which may be the preferred configuration for storage or transportation. The foldable lateral vision shield material 145 may be some opaque, flexible material such as, but not limited to, Mylar™, cloth, plastic, paper, or rubber or some combination thereof.

In FIG. 5A the material 146 constituting part of the foldable lateral vision shield 145 may be seen folded flat.

Figure 5B:
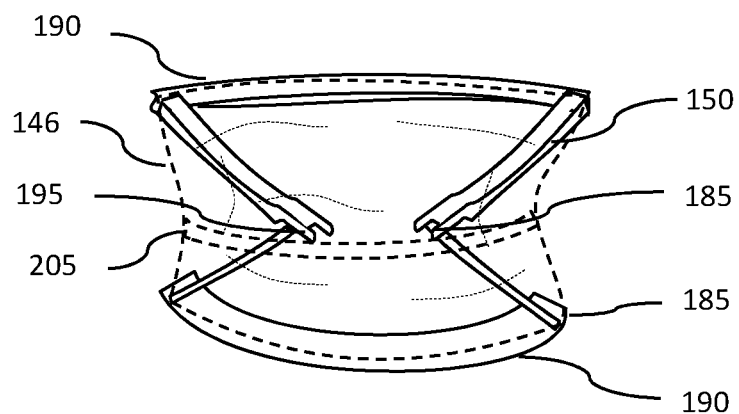
FIG. 5B shows an isometric view of partially opened arched collapsible elements supporting a foldable lateral vision shield in a preferred embodiment of the present invention.

FIG. 5B shows an isometric view of partially opened arched collapsible elements supporting a foldable lateral vision shield in a preferred embodiment of the present invention.

FIG. 5B shows a structure having four arched collapsible elements 150 joined by hinges 185 to two arched support elements 190.

The structure of FIG. 5B is effectively a six-bar linkage. In order for such a linkage to maintain a stable state when fully opened, it may be necessary to have motion restraints 195 at one or more of the hinges, and preferably on all six hinges. These motion restraints 195 may, for instance, prevent the hinged bars from moving either past a 90-degree angle relative to each other, as may be the case in the motion restraints 195 associated with the hinges 185 joining the arched support elements 190 to the arched collapsible elements 150. Alternately, the motion restraints 195 may prevent the hinged bars from moving past a 180-degree angle relative to each other, as may be the case in the motion restraints 195 associated with the hinges 185 joining the arched support elements 190 to each other. The motion restraints 195 may maintain their maximum opening state using temporary locking or latching devices such as, but not limited to, a press fit stud and aperture, a hook and look fastening, a magnet and ferrous plate, or some combination thereof.

One of ordinary skill in the art will, however, appreciate that alternate hinged bar arrangements may also be utilized to achieve a foldable lateral vision shield 145. A four-bar link in which the hinges have motion restraints may, for instance, be effective, although it would introduce a slightly more complex unfolding of the foldable lateral vision shield material.

In order to help ensure that the foldable lateral vision shield material 146 folds and unfolds predictably, there may also be a fold stabilizing bar 205. The fold stabilizing bar 205 may be ridge that is less flexible than the foldable lateral vision shield material 146 and is preferably located along the line of the preferred line of fold when the material is fully folded.

The fold stabilizing bar 205 may be a thicker ridge of the foldable lateral vision shield material 146 or it may be an attached strip that is less flexible than the foldable lateral vision shield material 146 such as, but not limited to, plastic, cardboard, metal, fabric or some combination thereof. The fold stabilizing bar 205 may be attached to the foldable lateral vision shield material 146 by, for instance, a process such as, but not limited to, gluing, welding, stitching, stapling or some combination thereof.

Figure 5C:
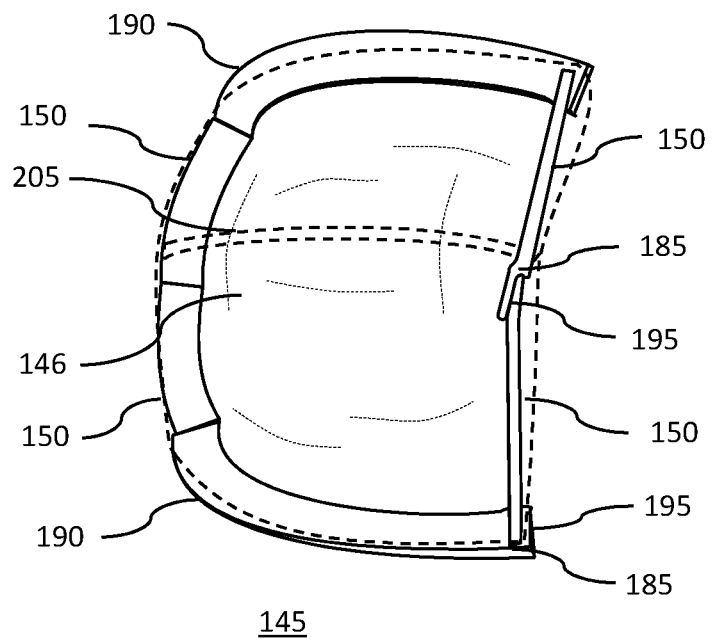
FIG. 5C shows an isometric view of fully opened arched collapsible elements supporting a foldable lateral vision shield in a preferred embodiment of the present invention.

FIG. 5C shows an isometric view of fully opened arched collapsible elements supporting a foldable lateral vision shield material 146 to form part or all of a foldable lateral vision shield 145 in a preferred embodiment of the present invention.

The foldable lateral vision shield material 146 that may be attached to the two arched support elements 190 may now be stretched taut against the four fully extended arched collapsible elements 150, forming a slightly curved surface that may constitute all or part of a foldable lateral vision shield 145 that may be removably attached to a removable, external peripheral holder for a video game controller via the mechanisms described above.

Each pair of arched collapsible elements 150 may now be aligned at about 180-degrees with respect to each other, having been rotated about their joining hinges 185 to the limit allowed by a motion restraint 195. The motion restraints 195 may also incorporate temporary latching devices that hold the elements in this position, as described above.

The arched collapsible elements 150 may now be aligned at about 90-degrees with respect to the arched support elements 190, having been rotated about their joining hinges 185 to the limit allowed by a motion restraint 195. The motion restraints 195 may also incorporate temporary latching devices that hold the elements in this position, as described above.

The fold stabilizing bar 205 may also help establish the curvature of the foldable lateral vision shield material 146.

In further embodiments of the invention, the receiving receptacle may be designed to accommodate more than one removable tab. In this way the game player may, for instance, be able to use a smart phone at the same time as using a lateral vision shield. The same functionality may also be achieved by having a single tab supporting structure that is both a lateral vision shield and a structure for supporting a smart phone or any other suitable device or gadget.

In this way, the inside surface may, for instance, display more permanent information that may be useful to the player such as, but not limited to, game rules, cheat sheet tips, maps of a region in which the game is being played, or some combination thereof, while the video screen or smart phone is displaying information such as, but not limited to, high definition, high detail local map of the player's current environment, specific cheat-sheet type tips for a current situation, a specific view of the environment as seen from the game player's avatar's current location, or some combination thereof.

Although this invention has been described with a certain degree of particularity, it is to be understood that the present disclosure has been made only by way of illustration and that numerous changes in the details of construction and arrangement of parts may be resorted to without departing from the spirit and the scope of the invention.

The invention claimed is:

1. A removable, external peripheral holder for a hand-held game controller, comprising:
   a left retaining annulus and a right retaining annulus, shaped and sized to be a circumscribing, external fit to a respective left and a right holding portion of said game controller;
   a receiving receptacle comprising a front retaining element and a rear retaining element separated by a gap, and wherein said retaining elements comprise surfaces oriented perpendicular to a direction of play of said game controller and one or more locating slots; and
   a cantilevered connecting element, extending forward of said game controller when held in a playing orientation, and joining said receiving receptacle to said left and right retaining annuli.

2. The external peripheral holding device of claim 1 further comprising:
   a removable tab shaped and sized to be a lock-and-key fit to said receiving receptacle having one or more locating taps corresponding in shape and location to said locating slots; and
   a structural element attached to said removable tab.

3. The external peripheral holding device of claim 2 wherein said structural element further comprises a lateral vision shield.

4. The external peripheral holding device of claim 3 wherein said lateral vision shield is a foldable lateral vision shield comprising one or more arched collapsible elements and one or more arched support elements.

5. The external peripheral holding device of claim 4 wherein said arched collapsible elements form one or more six-bar linkages and further comprising one or more motion restraints adjacent a hinge and preventing two of said arched collapsible elements from being opened by more than 180-degrees with respect to each other, and one or more motion restraints adjacent a hinge and preventing one of said arched collapsible elements and one of said arched support elements from being opened by more than 90-degrees with respect to each other.

6. The external peripheral holding device of claim 5 further comprising one or more temporary latching elements adjacent one of said motion restraints.

7. The external peripheral holding device of claim 2 wherein said structural element further comprises a smart phone holder.

8. The external peripheral holding device of claim 2 wherein said structural element further comprises a commercial insignia holder.

* * * * *